United States Patent [19]

Giles, Jr. et al.

[11] Patent Number: 4,607,079.

[45] Date of Patent: Aug. 19, 1986

[54] BLEND OF POLYCARBONATE, ACRYLATE ELASTOMERIC COPOLYMER AND A PHENOXY RESIN

[75] Inventors: Harold F. Giles, Jr., Cheshire, Mass.; Ping Y. Liu, Naperville, Ill.

[73] Assignee: General Electric Company, Mt. Vernon, Ind.

[21] Appl. No.: 747,784

[22] Filed: Jun. 24, 1985

[51] Int. Cl.$^4$ .................... C08L 63/00; C08L 51/00
[52] U.S. Cl. ..................................... 525/65; 525/67; 525/109; 525/133; 525/902; 525/930
[58] Field of Search ................ 525/67, 133, 148, 463, 525/902, 930, 65, 109

[56] References Cited

U.S. PATENT DOCUMENTS 3,480,695 11/1969 Hale .................................... 525/930
4,299,928 11/1981 Witman ................................ 525/67

Primary Examiner—Theodore E. Pertilla
Attorney, Agent, or Firm—Martin B. Barancik

[57] ABSTRACT

A composition comprising a major amount of an aromatic polycarbonate and quantities of both an acrylate elastomeric copolymer with a second order transition temperature, Tg, of less than $-10°$ C. and a phenoxy resin effective to substantially maintain the impact strength and ductility at break after exposing a stressed part to brake fluid comprising alcohols and ethers.

13 Claims, No Drawings

BLEND OF POLYCARBONATE, ACRYLATE ELASTOMERIC COPOLYMER AND A PHENOXY RESIN

BACKGROUND OF THE INVENTION

Aromatic carbonate polymers are well known, commercially available materials having a variety of applications in the plastics art. Such carbonate polymers may be prepared by reacting a dihydric phenol, such as 2,2-bis(4-hydroxyphenyl)propane, with a carbonate precursor, such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane, no lead gasoline, acetone, heptane and carbon tetrachloride as well as basic type solvents such as alcohols, amines and the like when such solvents are in contact with stressed parts fabricated from aromatic polycarbonate resin. The most significant effect is a loss in vital impact strength and an increased brittle type failure in the standard Notched Izod test systems. Contact with such solvent may occur depending upon the application to which the compositions are being applied. It has now been discovered that a blend of an elastomer and a phenoxy resin with a major amount of an aromatic polycarbonate retained impact strength and ductility when exposed under test conditions to a standard brake fluid comprising primarily ethers and alcohols. The same compositions did not perform well when exposed to a high aromatic gasoline under the same test conditions.

SUMMARY OF THE INVENTION

In accordance with the invention, there is a composition comprising a major amount of an aromatic polycarbonate and quantities of both an acrylate elastomeric copolymer with a second order transition temperature, Tg, of less than −10° C. and a phenoxy resin effective to substantially maintain the impact strength and ductility at break in the Notched Izod test system after exposing a stressed part to brake fluid comprising alcohols and ethers.

Another aspect of the invention is a composition comprising
  a. about 60–92 weight percent of an aromatic polycarbonate;
  b. about 6–30 weight percent of a phenoxy resin;
  c. about 2–10 weight percent of an acrylate elastomeric copolymer with a second order transition temperature, Tg of less than −10° C.

DESCRIPTION OF THE INVENTION

The aromatic polycarbonates useful in the invention are typified as possessing recurrent structural units of the formula:

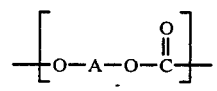

Formula 1 wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are
2,2-bis-(4-hydroxyphenyl)propane;
hydroquinone;
resorcinol;
2,2-bis-(4-hydroxyphenyl)pentane;
2,4′-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,4′-dihydroxydiphenyl sulfone;
5′-chloro-2,4′-dihydroxydiphenyl sulfone;
bis-(4-hydroxyphenyl)diphenyl sulfone;
4,4′-dihydroxydiphenyl ether;
4,4′-dihydroxy-3,3′-dichlorodiphenyl ether;
4,4′-dihydroxy-2,5-dihydroxydiphenyl ether;
and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention copolyestercarbonates as disclosed in Goldberg U.S. Pat. No. 3,169,121 are also included within the term polycarbonate. Branched polycarbonates are also useful. To avoid unnecessarily detailed description, the disclosures of U.S. Pat. Nos. 3,028,365; 3,334,154; 4,001,184 and 4,131,575 are incorporated herein by reference. In any event, the preferred aromatic carbonate polymer is a homopolymer derived from 2,2-bis(4-hydroxyphenyl)propane (bisphenol-A).

In short, the dihydric phenol is preferably represented by the formula

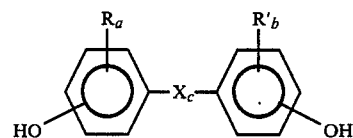

Formula 2 wherein R and R' are the same or different and are alkyl of one to four carbon atoms, inclusive, preferably one to three, and halogen, preferably chloro or bromo.

The letters a and b are the same or different and are an integer of 0, 1, 2, 3 or 4, preferably 0, 1 or 2.

X is selected from alkylene of two to ten carbon atoms, inclusive, alkylidene of one to ten carbon atoms, inclusive, cycloalkylene of four to twelve carbon atoms, inclusive, cycloalkylidene of four to twelve carbon atoms, inclusive, —S—, —S—S—,

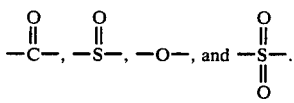

c is 0 or 1.

The dihydric phenols are preferably 4,4'-bisphenols.

The acrylate elastomeric copolymer having a second order transition temperature, Tg of less than $-10°$ C. is any copolymer having a sufficient amount of a $C_1$-$C_6$ acrylate to provide elastomeric qualities. Examples of the acrylate ester groups include methyl, ethyl, propyl, n-butyl, n-pentyl, n-hexyl and isomers thereof such as isopropyl. N-butyl is preferred.

As a comonomer together with the acrylate can be other unsaturated monomers which will still provide an elastomeric molecule, for example, an acrylonitrile, a styrene and an alkacrylate such as a methacrylate. Grafted copolymers are specifically included. Examples of such polymers include acrylonitrile styrene acrylate (ASA), and methacrylate butadiene styrene (MABS). Preferred are core-shell polymers of the multiphase composite interpolymer type. Of these the core shell type, also known as multiphase composite interpolymer, described in U.S. Pat. No. 4,096,202, incorporated by reference, are particularly preferred.

Multiphase composite interpolymer is an interpolymer comprising about 25 to 95 percent by weight of a first elastomeric phase and about 75 to 5 percent by weight of a final rigid thermoplastic phase. One or more intermediate phases are optional, for example, a middle stage polymerized from about 75 to 100 percent by weight styrene.

The first stage of multiphase composite interpolymer is polymerized from about 75 to 99.8 weight percent $C_1$ to $C_6$ alkyl acrylate resulting in an acrylic rubber core having a Tg below about $-10°$ C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and poly-methacrylic esters of polyols such as butylene diacrylate and dimethacrylate, trimethylol propane trimethacrylate, and the like, di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization, and consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid itaconate. Somewhat less preferred are the diallylesters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as graftlinking agent with a final stage polymerized from about 60 to 100 percent by weight methyl methacrylate. A preferred two stage interpolymer of this type is commercially available under the tradename, ACRYLOID KM 330, from Rohm & Haas Chemical Company.

The final stage monomer system can be comprised of $C_1$ to $C_6$ methacrylate, styrene, acrylonitrile, alky acrylates, allyl methacrylate, diallyl methacrylate, and the like, as long as the overall Tg is at least 20° C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl, amino and amide groups.

The phenoxy resin is a resin obtained by the reaction of a dihydric phenol of the general type shown in Formula 2 with an epichlorohydrin to produce a polymer having recurring units of the general formula

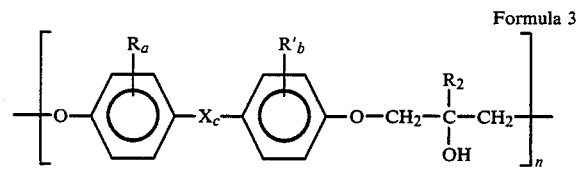

Formula 3 wherein R, R', a, b, c and X are defined as in Formula 2, the hydroxys are fixed para to the X substituent, $R_2$ is hydrogen or an alkyl of one to six carbon atoms, inclusive, and n is an integer of 3 to 200, preferably from about 75 to 190. The preferred dihydric phenol is bisphenol-A. The preferred $R_2$ is hydrogen.

The polycarbonate is a major quantity of the composition of polycarbonate, elastomeric acrylate copolymer and phenoxy resin. The elastomeric acrylate copolymer and phenoxy resin are present in quantities effective to substantially maintain the impact strength and ductility at break in the Notched Izod test system. Generally a composition comprising about 60 to 92 weight percent of an aromatic polycarbonate, about 6 to 30 weight percent of a phenoxy resin and about 2 to 10 weight percent of an elastomeric acrylate copolymer, all percentage measured by the polycarbonate, elastomeric copolymer and phenoxy total, is a preferred compositional formulation. Even more preferred are polycarbonates of 68–89 weight percent, phenoxy of 8 to 25 weight percent and elastomer of 3 to 7 weight percent.

Other additives, stabilizers and fillers usually associated with polycarbonate can also be present in the composition. Examples of such materials include thermal stabilizers, hydrolytic stabilizers, ultraviolet stabilizers, antioxidants, flame retardant additives, glass fibers, carbon fibers, carbon blacks, pigments, dyes and the like.

In the examples below the polycarbonate employed is LEXAN® 145, a medium viscosity polycarbonate resin. The elastomeric acrylate copolymer is Acryloid KM 330 available from Rohm and Haas. This polymer is 79.2 wt. % n-butylacrylate, 20 wt. % methylmethacrylate, 0.4 wt. % 1.3 butylene diacrylate and 0.4 wt. % dialkyl maleate. The phenoxy resin is UCAR® PKHH resin available from Union Carbide wherein bisphenol-A is the dihydric phenol and R2 is hydrogen.

The composition was extruded at 260° C. and the izod bars of dimensions 63.5 mm×12.7 mm×3.2 mm and 63.5 m×12.7 m×6.4 mm molded at 260° C. The Izod bars were tested for Notched Izod (impact testing) under ASTM D260. Additionally the compositions were tested for DTUL according to ASTM D648. The double gate value is obtained in a 3.2 mm thick sample with a 2 port entry system, the impact value obtained at the weld line. Further, the Izod bars were soaked for two hours in Prestone® DOT 3 super heavy duty polyglycol based hydraulic brake fluid on a stress jig at a pressure of 240 kgf/cm$^2$. The analysis of the Prestone®, available from Union Carbide, is below. After drying the Izod bars were tested for impact strength under ASTM D260. The superscript gives the percent ductility at break. No superscript means 100% ductile.

| COMPOSITION OF SAE COMPATIBILITY FLUID | |
|---|---|
| CONSTITUENT | COMPOSITION WT. % |
| 1. Monoethyl ether of diethylene glycol | 51.70 |
| 2. Monobutyl ether of diethylene glycol | 2.26 |
| 3. Methyl ether of tripropylene glycol | 5.12 |
| 4. Polyalkylene oxide triol viscosity 900 ± 45 SUS at 38° C. (100° F.); (200 ± 10 cSt at 38° C. (100° F.); sp gr 1.064 20/20° C.[b] | 5.30 |
| 5. Ethylene glycol | 2.47 |
| 6. Diethylene glycol | 1.34 |
| 7. Propylene glycol | 2.45 |
| 8. Methyl isobutyl carbinol | 4.30 |
| 9. Polypropylene glycol 2025 MW | 2.30 |
| 10. Polypropylene glycol 120 MW | 1.30 |
| 11. Propylene glycol monorichiholeate | 3.30 |
| 12. Reacted castor oil-polypropylene glycol | 1.90 |
| 13. 2-methyl, 2,4 pentanediol | 2.80 |
| 14. Monobutyl ether 1,2 oxyethylene, 1,2 oxypropylene glycols sp gr 1.058 20/20° C.; viscosity 2000 ± 100 SUS at 38° C. (100° F.); (440 ± 22 cSt at 38° C. (100° F.)[c] | 3.16 |
| 15. Monobutyl ether 1,2 oxyethylene, 1,2 oxypropylene glycols sp gr 1.038 20/20° C.; viscosity 260 ± 15 SUS at 38° C. (100° F.); (56.5 ± 3 cST at 38° C. (100° F.)[c] | 8.85 |
| 16. Borax-ethylene glycol condensate (25% sodium tetraborate, anhydrous) | 0.25 |
| 17. Diphenylol propane | 0.53 |
| 18. Sodium nitrate | 0.01 |
| 19. Sodium tetraborate | 0.10 |
| 20. Potassium tetraborate | 0.18 |
| 21. Tricresyl phosphate | 0.10 |
| 22. Amino imidazoline salt 33% solution | 0.01 |
| 23. Potassium castor oil soap (neutral-anhydrous) | 0.18 |
| 24. N—phenylmorpholine | 0.09 |
| TOTAL | 100.00 |

[a]Obtainable from the Society of Automotive Engineers, Inc. 400 Commonwealth Drive, Warrendale, PA 15096.
[b]Glycerin initiated trial using 50-50 charge ethylene oxide and propylene oxide.
[c]Butanol initiated monoether using 50-50 charge ethylene oxide and propylene oxide.

TABLE 1

| | COMPOSITION, WT. % | | | NI Kgfcm/cm | | | | | |
|---|---|---|---|---|---|---|---|---|---|
| | | | | SAMPLE | | | | Kgfcm | |
| | POLYCARBONATE 0.49-0.52 I.V.* | PHENOXY RESIN | ACRYLATE COPOLYMER | 3.2 mm | | 6.4 mm | | DG cm AS IS | DTUL °C. |
| | | | | AS IS | BRAKE FLUID AGED | AS IS | BRAKE FLUID AGED | | |
| Control | | | | | | | | | |
| 1 | 100 | — | — | 80.0 | Broke | 8.7[0] | — | 217.7 | 133 |
| 2 | 96 | — | 4 | 95.3 | Broke | 80.0 | Broke | 217.7 | 131 |
| 3 | 90 | 10 | — | 56.1 | 10.9[0] | 9.3[0] | — | 201.4 | 124 |
| 4 | 80 | 20 | — | 31.6[20] | — | 9.3[0] | — | 138.8[20] | 123 |
| Example | | | | | | | | | |
| 1 | 86 | 10 | 4 | 90.9 | 71.3 | 82.7 | 62.6 | 180.2 | 122 |
| 2 | 78 | 18 | 4 | 88.7 | 77.8 | 71.3 | 60.5 | 170.9 | 116 |

*25° C. methylene chloride

As is readily observed from the data, neither the phenoxy resin nor the acrylate copolymer alone can maintain the impact resistance of the composition after exposure to the brake fluid. Rather it is the combination of the two which provides substantial maintenance of the impact resistance and ductility after exposure to the brake fluid.

As shown in the Table below, the resistance of the composition to high octane aromatic containing gasoline exposure is very poor. The composition was soaked in high octane aromatic containing gasoline for two hours on a jig at a pressure of 240 Kgf/cm$^2$. Below are the results.

TABLE 2

| Example | COMPOSITION, WT. % | | | NI Kgfcm/cm | | | |
| --- | --- | --- | --- | --- | --- | --- | --- |
| | | | SAMPLE | | | | |
| | POLYCARBONATE 0.49–0.52 I.V. | PHENOXY RESIN | ACRYLATE COPOLYMER | 3.2 mm | | 6.4 mm | |
| | | | | AS IS | GASOLINE | AS IS | GASOLINE |
| 1 | 86 | 10 | 4 | 90.9 | 2.1⁰ | 82.7 | 2.1⁰ |
| 2 | 78 | 18 | 4 | 88.7 | 2.1⁰ | 71.3 | 2.1⁰ |

What is claimed is:

1. A composition comprising a major amount of an aromatic polycarbonate and quantities of both an acrylate elastomeric copolymer with a second order transition temperature, Tg, of less than −10° C. and a phenoxy resin effective to substantially maintain the impact strength and ductility at break after exposing a stressed part to brake fluid comprising alcohols and ethers.

2. The composition in accordance with claim 1 wherein the aromatic polycarbonate is bisphenol-A polycarbonate.

3. The composition in accordance with claim 1 wherein the copolymer is primarily a rubbery acrylate.

4. The composition in accordance with claim 3 wherein the acrylate is n-butylacrylate.

5. The composition in accordance with claim 3 wherein the copolymer is a multiphase composite interpolymer.

6. The composition in accordance with claim 1 wherein the phenoxy resin is of the formula

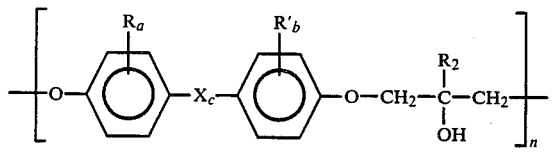

where
R and R' are the same or different and are alkyl of one to four carbon atoms, inclusive or halogen;
a and b are the same or different and are an integer of 0, 1, 2, 3 or 4;
X is alkylene of two to ten carbon atoms, inclusive; alkylidene of one to ten carbon atoms, inclusive; cycloalkylene of four to twelve carbon atoms, inclusive; cycloalkylidene of four to twelve carbon atoms, inclusive; —S—, —S—S—,

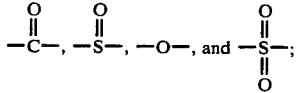

c is 0 or 1; and
n is 3 to 100.

7. The composition in accordance with claim 1 wherein the polycarbonate is from about 60–92 wt. percent, the acrylate elastomer is from about 2 to 10 wt. percent and the phenoxy resin is from about 6 to 30 wt. percent.

8. The composition in accordance with claim 6 wherein a and b are zero, c is one, X is 2,2'-propylidene, $R_2$ is hydrogen and n is about 75 to 190.

9. The composition in accordance with claim 8 wherein the aromatic polycarbonate is bisphenol-A polycarbonate.

10. The composition in accordance with claim 9 wherein the acrylate elastomer is a multiphase composite interpolymer wherein the core comprises n-butylacrylate and the shell comprises methyl methacrylate.

11. The composition in accordance with claim 10 wherein the bisphenol-A polycarbonate is about 68 to 89 wt. percent, the acrylate elastomer is about 3 to 7 wt. percent and the phenoxy resin is about 8 to 25 wt. percent.

12. A composition comprising about 60 to 92 wt. percent of an aromatic polycarbonate, about 6 to 30 weight percent phenoxy resin and about 2 to 10 weight percent of an acrylate elastomeric copolymer with a second order transition temperature, Tg, of less than −10° C.

13. The composition in accordance with claim 12 wherein the polycarbonate is from about 68–89 wt. percent, the phenoxy resin is from about 8 to 25 wt. percent and the acrylate copolymer is from about 3 to 7 wt. percent.

* * * * *